(12) United States Patent
Mizukami et al.

(10) Patent No.: US 6,911,259 B2
(45) Date of Patent: Jun. 28, 2005

(54) GLASS FIBER-REINFORCED THERMOPLASTIC RESIN PELLETS AND THEIR PRODUCTION PROCESS

(75) Inventors: Toru Mizukami, Tokyo (JP); Kengo Ozaki, Tokyo (JP)

(73) Assignee: Asahi Fiber Glass Company, Limited, Tokyo (JP)

( * ) Notice: Subject to any disclaimer, the term of this patent is extended or adjusted under 35 U.S.C. 154(b) by 211 days.

(21) Appl. No.: 10/458,270

(22) Filed: Jun. 11, 2003

(65) Prior Publication Data

US 2003/0235688 A1 Dec. 25, 2003

(30) Foreign Application Priority Data

Jun. 21, 2002  (JP) ........................................ 2002-181517

(51) Int. Cl.$^7$ ................................................. B32B 9/00
(52) U.S. Cl. ...................... 428/403; 428/407; 428/392; 428/375; 428/378; 427/434.4; 427/434.5; 427/434.6
(58) Field of Search ................................ 428/403, 407, 428/375, 378, 392; 427/434.4, 434.5, 434.6

(56) References Cited

U.S. PATENT DOCUMENTS

| | | | |
|---|---|---|---|
| 6,183,864 B1 * | 2/2001 | Mizukami et al. | 428/392 |
| 6,291,064 B1 * | 9/2001 | Kadowaki et al. | 428/332 |
| 6,686,034 B1 * | 2/2004 | Mizukami et al. | 428/297.4 |
| 6,841,230 B2 * | 1/2005 | Yokoo et al. | 428/294.7 |

FOREIGN PATENT DOCUMENTS

| | | | |
|---|---|---|---|
| EP | 0 360 430 | | 3/1990 |
| EP | 0444867 | * | 9/1991 |
| EP | 0 444 867 | | 9/1991 |
| EP | 0 491 043 | | 6/1992 |
| EP | 0 611 640 | | 8/1994 |
| EP | 0 875 351 | | 11/1998 |
| EP | 0900638 | * | 3/1999 |
| EP | 0 900 638 | | 3/1999 |
| EP | 0 950 504 | | 10/1999 |
| GB | 882 875 | | 11/1961 |
| JP | 55-16851 | | 2/1980 |
| JP | 59-49913 | | 3/1984 |
| JP | 59-111938 | | 6/1984 |
| JP | 2-145304 | | 6/1990 |
| JP | 5-50517 | | 3/1993 |
| JP | 6-23742 | | 2/1994 |
| JP | 6-114830 | | 4/1994 |

* cited by examiner

*Primary Examiner*—Leszek Kiliman
(74) *Attorney, Agent, or Firm*—Oblon, Spivak, McClelland, Maier & Neustadt, P.C.

(57) ABSTRACT

A process for producing glass fiber-reinforced thermoplastic resin pellets, which comprises a step of drawing out glass fiber strands from the inside of glass fiber rolls and introducing them into a resin impregnation die, a step of supplying a molten thermoplastic resin into the resin impregnation die and impregnating the glass fiber strands with the thermoplastic resin, a step of drawing out the glass fiber strands impregnated with the thermoplastic resin from the resin impregnation die and cooling and solidifying the thermoplastic resin to obtain a linear molded product, and a step of cutting the molded product into a predetermined length, wherein as the glass fibers, glass fiber strands drawn out from rolls, each roll obtained by bundling monofilaments having a diameter of from 6 to 25 $\mu$m and winding them so that the inner diameter will be from 18 to 50 cm, are used.

10 Claims, 4 Drawing Sheets

Fig. 5
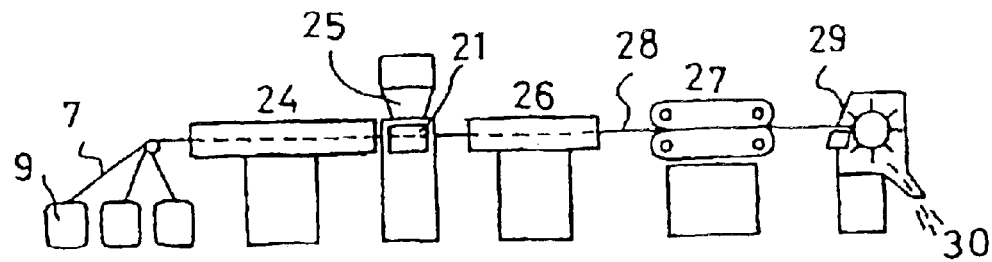
Fig. 6(a)      Fig. 6(b)
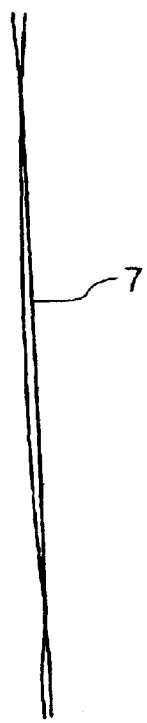 
(a)      (b)
Fig. 7
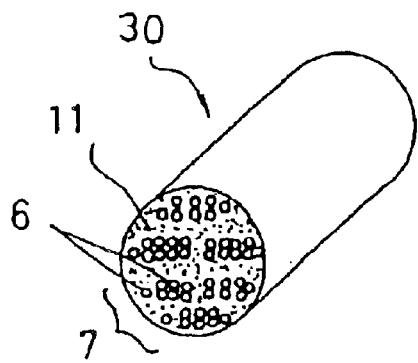

GLASS FIBER-REINFORCED THERMOPLASTIC RESIN PELLETS AND THEIR PRODUCTION PROCESS

The present invention relates to glass fiber-reinforced thermoplastic resin pellets as a molding material of FRTP (fiber-reinforced thermoplastic resin) and a process for producing them.

FRTP is formed by introducing pellets having the amount of a reinforcing material adjusted to a predetermined content, or introducing pellets containing no reinforcing material for a thermoplastic resin and pellets containing a reinforcing material in a predetermined proportion, into an injection machine, and injecting the pellets into a mold of the injection machine for solidification. As the reinforcing material for FRTP, chopped strands are widely used.

In a case where chopped strands are employed as a reinforcing material, chopped strands having a length at a level of from 3 to 6 mm and a thermoplastic resin are kneaded under heating usually by a screw of a twin-screw or single axis extruder and extruded, and then cut into a predetermined length, followed by pelletizing. The pellets have such a structure that chopped strands 12 are dispersed and contained in a thermoplastic resin 11, as illustrated in FIG. 8 for example.

However, with respect to FRTP employing the chopped strands as a reinforcing material, there are following problems. Namely, when the chopped strands and the thermoplastic resin are kneaded under heating by an extruder, the chopped strands are broken due to e.g. friction between the extrusion screw and the chopped strands. Further, the chopped strands are broken due to friction with a screw of an injection machine at the time of formation of FRTP, whereby the glass fibers are cut further short, and the fiber length which is originally from 3 to 6 mm becomes from about 0.05 to about 0.8 mm in the end. Accordingly, mechanical properties of a molded product, particularly impact strength can not adequately be improved.

On the other hand, glass fiber-reinforced thermoplastic resin pellets obtained by impregnating continuous fibers with a thermoplastic resin and solidifying the resin, and cutting the continuous fibers into a predetermined length, have been favorably employed, since long glass fibers are present in the pellets, whereby the glass fibers remain long to a certain extent although the glass fibers are broken due to friction with a screw of an injection machine at the time of formation of FRTP, and thus a molded product having high strength can be obtained.

It has been proposed to employ fibers drawn out from rolls such as direct wind rovings or cakes as the continuous fibers used for glass fiber-reinforced thermoplastic resin pellets. For example, in JP-A-5-50517, fiber bundles (strands) for reinforcement, wound into cakes, are employed so as to employ fibers with less local dispersion of the amount of the sizing agent attached.

A direct wind roving may be produced by a known method such as a method as disclosed in JP-A-59-111938. Specifically, a method as shown in FIGS. 4(a) and 4(b) may be mentioned. FIG. 4(a) is a front view illustrating an apparatus for producing a direct wind roving, and FIG. 4(b) is a side view illustrating the production apparatus. The direct wind roving 4 is produced in such a manner that a large number of monofilaments 6 are drawn out from a bushing 1, the monofilaments 6 are coated with a sizing agent by means of an applicator 2, the monofilaments 6 are bundled by means of a bundling component 3 to obtain a glass fiber strand 7, and the glass fiber strand 7 is wound into a cylindrical shape while traversing it by means of a guide component 5 reciprocating as illustrated by an arrow in FIG. 4(b), followed by drying under heating.

Further, the above cakes may be produced by a known method such as a method as disclosed in JP-A-55-16851 or JP-A-5-50517. Specifically, as illustrated in FIGS. 2(a) and 2(b), a cake 9 as a roll can be produced in such a manner that a large number of monofilaments 6 are drawn out from a bushing 1, the monofilament 6 are coated with a sizing agent by means of an applicator 2, the monofilaments 6 are bundled by means of a bundling component 3 to obtain a glass fiber strand 7, and the glass fiber strand 7 is wound while traversing it by means of a spiral wire 8.

In preparation of the glass fiber-reinforced thermoplastic resin pellets, if the strand is drawn out from the outside of the roll, so-called outside draw, the draw rate tends to be low and the productivity tends to be poor, since the direct wind roving or the cake is attached to a rotational axis and the strand is drawn out therefrom. Further, usually the glass fibers are dried after coated with a sizing agent, whereby the monofilaments are likely to be broken due to tension imparted to the strand at the time of drawing, and it is very difficult to draw out the strand from the outside of the roll without breaking the monofilaments. When the monofilaments are broken, the strand tends to fuzz and its count changes, whereby stable production is hardly achieved. Accordingly, usually a method of drawing out the fiber from the inside of the roll as illustrated in FIG. 1, i.e. so-called inside draw is suitable employed.

However, although this inside draw is excellent in drawing properties as compared with outside draw in preparation of glass fiber-reinforced thermoplastic resin pellets (hereinafter sometimes referred to simply as pellets), as different from the above-described method for producing chopped strands, the glass fiber strand drawn out from the inside is drawn out from the roll by applying a tension while fixing the roll, whereby the roll is drawn out while rotating along the inner periphery of the roll, and is twisted once every one rotation of the roll.

In this case, a conventional roll has a winding diameter i.e. an inner diameter at a level of from 7.5 to 16 cm and is relatively small. The winding pitch of the glass fiber strand is the same regardless of the winding diameter, and accordingly the number of twist per unit length of the drawn strand becomes larger when the winding diameter is smaller. Accordingly, the glass fiber strand drawn out from a conventional roll is strongly twisted in such a state that tension is applied thereto. If it is impregnated with a thermoplastic resin by means of e.g. an impregnation die, the glass fiber strand is not adequately open as the monofilaments, whereby pellets which are inadequately impregnated with the thermoplastic resin will be obtained. As a result, the adhesion between the monofilaments and the thermoplastic resin in the pellets tends to be non-uniform, whereby a molded product obtained by e.g. injection molding tends to be poor in strength.

Further, as a method of removing the twist of the glass fiber strand drawn out from the inside, a method of putting the roll on e.g. a rotating table and synchronizing the table in a direction to remove the twist while the strand makes one revolution and is drawn out, however, such is unfavorable since a large-scale apparatus will be required.

Under these circumstances, it is an object of the present invention to provide glass fiber-reinforced thermoplastic resin pellets and a process for producing them, which easily reduces the twist without using a complicated apparatus, with which the gap in individual monofilament is uniformly impregnated with a thermoplastic resin, and which makes it possible to produce the pellets with high productivity.

In order to achieve the above object, the present inventors have conducted extensive studies on the above problems focusing on formation of the twist and as a result, found that the twist of the glass fiber strand drawn out from the inside of the roll can be reduced by increasing the winding diameter of the roll. The present invention has been accomplished on the basis of this discovery.

Namely, the present invention provides a process for producing glass fiber-reinforced thermoplastic resin pellets, which comprises a step of drawing out glass fiber strands from the inside of glass fiber rolls and introducing them into a resin impregnation die, a step of supplying a molten thermoplastic resin into the resin impregnation die and impregnating the glass fiber strands with the thermoplastic resin, a step of drawing out the glass fiber strands impregnated with the thermoplastic resin from the resin impregnation die and cooling and solidifying the thermoplastic resin to obtain a linear molded product, and a step of cutting the molded product into a predetermined length, wherein as the glass fibers, glass fiber strands drawn out from rolls obtained by bundling monofilaments having a diameter of from 6 to 25 μm and winding them so that the inner diameter will be from 18 to 50 cm, are used.

The present invention further provides glass fiber-reinforced thermoplastic resin pellets which are produced by the above process, wherein the glass fibers are substantially continuous over the entire longitudinal direction of the pellets and are aligned almost in parallel with one another.

The present invention further provides a roll for glass fiber-reinforced thermoplastic resin pellets, wherein the twist multiplier TM of glass fiber strands drawn out from rolls satisfies the following formula:

$$TM=((\text{denier:g}/9{,}000\ m)^{1/2}\times(\text{number of twist per 1 m}))/287.4,$$

$$0.076 \leq TM \leq 0.350$$

In the accompanying drawings:

FIGS. 1(a) and 1(b) are perspective views illustrating the roll according to the present invention. FIG. 1(a) is a perspective view illustrating a direct wind roving, and FIG. 1(b) is a perspective view illustrating a cake.

FIG. 5 is a front view illustrating one example of an apparatus for producing pellets employing the cake of the present invention.

FIG. 6(a) is a front view illustrating a part of the strand drawn out from the cake shown in FIG. 5, and FIG. 6(b) is a front view illustrating a part of the strand drawn out from a conventional cake.

FIG. 7 is a perspective view illustrating one example of a pellet of the present invention.

Now, the present invention will be described in detail with reference to the preferred embodiments.

The thermoplastic resin used for the glass fiber-reinforced thermoplastic resin pellets (hereinafter referred to simply as L-FTP pellets) of the present invention is not particularly limited, and polyethylene, polypropylene, nylon, polyethylene terephthalate, polybutylene terephthalate, polystyrene, an AS (acrylonitrile-styrene) resin, an ABS (acrylonitrile-butadiene-styrene) resin, PPS (polyphenylene sulfide), PEI (polyether imide) or PEEK (polyether ether ketone) may, for example, be preferably used. Into the thermoplastic resin, a coloring agent, a modifier, a filler other than glass fibers, a known additive or the like may optionally be incorporated depending upon the intended purpose and molding conditions, and they may be kneaded in accordance with a conventional method.

In the present invention, as the glass fibers, glass fiber strands (hereinafter referred to simply as strands) drawn out from the inside of rolls, obtained by bundling monofilaments having a diameter of from 6 to 25 μm and winding them, followed by air drying or drying by heating as the case requires, are employed.

If the diameter of the monofilaments is less than 6 μm, productivity of the glass fibers tends to be low, thus increasing the cost, such being impractical. Further, if the diameter of the monofilaments exceeds 25 μm, stiffness of the monofilaments increases and the monofilaments tend to be fragile, and thus the monofilaments are likely to be broken due to friction between a mold and the glass fibers or among glass fibers when the monofilaments pass through a resin impregnation die of a L-FTP pellet production apparatus, whereby quality of the pellets tends to decrease, and at the same time, the inside of the production apparatus is fuzzed, thus impairing productivity.

Figure 1A:
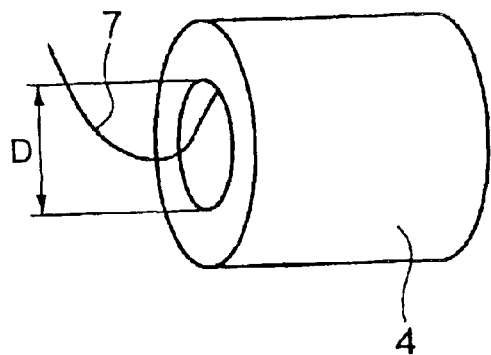
Figure 1B:
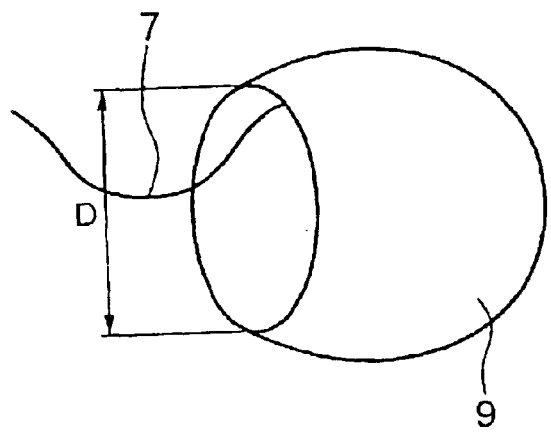

As the above roll, a cylindrical direct wind roving 4 as shown in FIG. 1(a) and a drum-shape cake 9 as shown in FIG. 1(b) may be mentioned as typical examples. The direct wind roving 4 and the cake 9 are obtained, as mentioned above, by winding a glass fiber strand 7 while traversing the strand by means of reciprocating guide component and spiral wire, respectively, and they can easily be prepared by conventional glass fiber production apparatus and method. At this time, a roll having an inner diameter D can be obtained by using a reeler having a winding diameter D.

It is essential that the roll of the present invention has an inner diameter D of from 18 to 50 cm, and the inner diameter is preferably from 25 to 33 cm. If the inner diameter is less than 18 cm, the strand is wound in a small diameter, whereby the number of twist per unit length tends to be large, the degree of twist tends to be high, and impregnation property with the thermoplastic resin tends to be poor. Further, it is required that the winding amount of the roll is large so as to decrease the frequency of job change such as splicing as far as possible, and if the winding amount is increased when the inner diameter is less than 18 cm, the roll tends to be thick, whereby drying efficiency of a sizing agent tends to be poor. Further, if the inner diameter exceeds 50 cm, although such is preferred in view of reducing the number of twist of the strand, the roll tends to be bulky, whereby a large storage space will be required, such being unfavorable in view of space. Further, if the inner diameter exceeds 50 cm with the same winding amount of the strand, the obtained roll tends to be thin, whereby the shape of the roll is less likely to be held. On the other hand, if the winding amount is large with a large inner diameter exceeding 50 cm, the roll tends to be heavy as well as bulky, whereby operation properties in handling and transportation tend to be poor.

The winding pitch when the strand is wound into a roll is substantially determined by the traverse speed of the guide component or the spiral wire of the glass fiber production apparatus, and further, the traverse width is restricted to the roll width of the roll. Accordingly, when the inner diameter of the roll is increased as mentioned above, the number of twist of the strand to be drawn out from the inside can securely be reduced.

Further, in the present invention, the roll width of the roll is preferably from 10 to 60 cm, more preferably from 15 to 40 cm. If the width is less than 10 cm, the winding amount is required to be large in order to reduce the frequency of job change such as splicing, and if the winding amount is large, the drying efficiency tends to be poor when the roll is prepared as mentioned above, and at the same time, the fiber is likely to be dangled when it is drawn out from the roll, thus causing nozzle clogging. On the other hand, if the roll width exceeds 60 cm, the strand is likely to rub the inside surface of the roll in the process of being introduced to the drawing guide when it is drawn out from the inside, whereby the monofilaments are likely to be broken.

As the direct wind roving is cylindrical, it has a stable shape as compared with the cake as described hereinafter, and it is thereby excellent in handling efficiency such as stacking property and transport property. On the other hand, as it is cylindrical, in production of the direct wind roving, such a phenomenon that the sizing agent is accumulated on the surface of the roll accompanying the movement of moisture in the step of air drying or drying by heating after winding of the glass fiber, i.e. so-called migration occurs. In such a case, the strand at the outer periphery part of the direct wind roving may be thrown away and does not have to be used, however, the strand exposed to each end surface of the direct wind roving must be used. Thus, when the strand is drawn out from the direct wind roving, there are parts on which the sizing agent is accumulated in a high concentration due to the migration on some parts. As mentioned, the glass fiber strand drawn out from the direct wind roving has parts on which the sizing agent is accumulated in a high concentration.

Further, of the direct wind roving, the number of the monofilaments bundled is usually at least 1,600, and accordingly the thermoplastic resin 11 hardly permeate the inside A of the strand 7, and it tends to be difficult to uniformly impregnate each separate monofilament 6 with the thermoplastic resin 11, thus causing decrease in mechanical properties of FRTP. On the other hand, in order to prevent imperfect impregnation with the thermoplastic resin 11, it is required to slowly pass the glass fiber strand 7 through a die and to spend time to contact it with the thermoplastic resin 11, whereby the production speed tends to significantly decrease, thus increasing the production cost. Accordingly, it is preferred to employ the cake as described hereinafter.

Further, after the strand of one roll is used up, or when the strand is broken during the use of a roll, it is required to splice two strands for further continuous production. In such a case, at a part where the two strands are spliced, the total number of the filaments doubles, and with respect to a conventional strand comprising at least 1,600 filaments, the spliced part is further hardly impregnated with the resin, and further, the strand is likely to be broken since the draw out resistance increases in the mold, and accordingly it is preferred to employ the cake as described hereinafter.

Figure 2A:
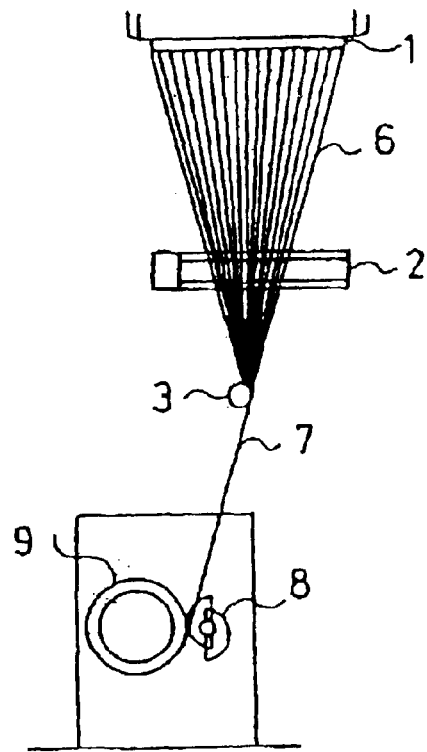
FIG. 2(a) is a front view illustrating an apparatus for producing glass fibers for a cake.
Figure 2B:
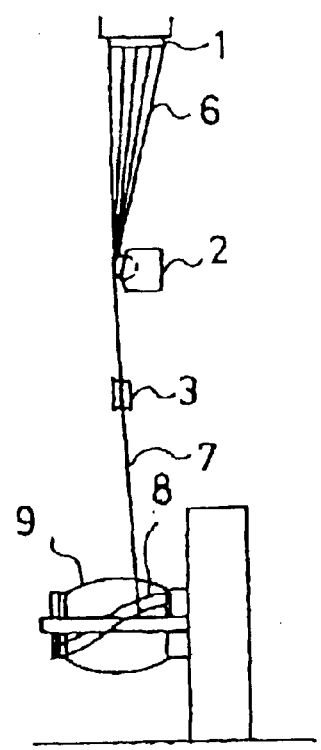
FIG. 2(b) is a side view illustrating the same.

On the other hand, with respect to the above cake, a drum-shape cake 9 can be produced as shown in FIGS. 2(a) and 2(b) for example as mentioned above, in such a manner that a large number of monofilaments 6 are drawn out from a bushing 1, the monofilaments 6 are coated with a sizing agent by means of an applicator 2, the monofilaments 6 were bundled by means of a bundling component 3 to obtain a glass fiber strand 7, and the glass fiber strand 7 is wound while traversing the strand by means of a spiral wire 8.

Figure 3A:
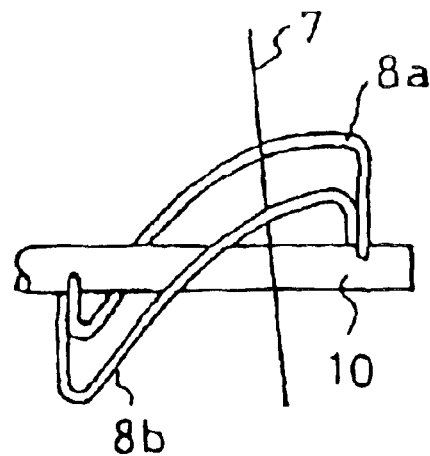
FIG. 3(a) is a front view illustrating a spiral wire in FIGS. 2(a) and 2(b)
Figure 3B:
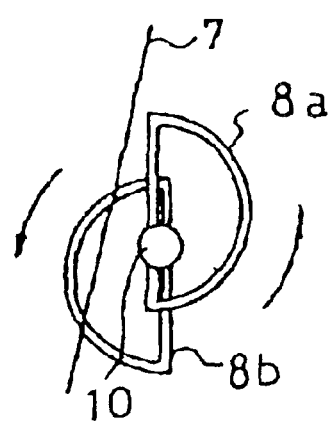
FIG. 3(b) is a side view illustrating the same.
Figure 4A:
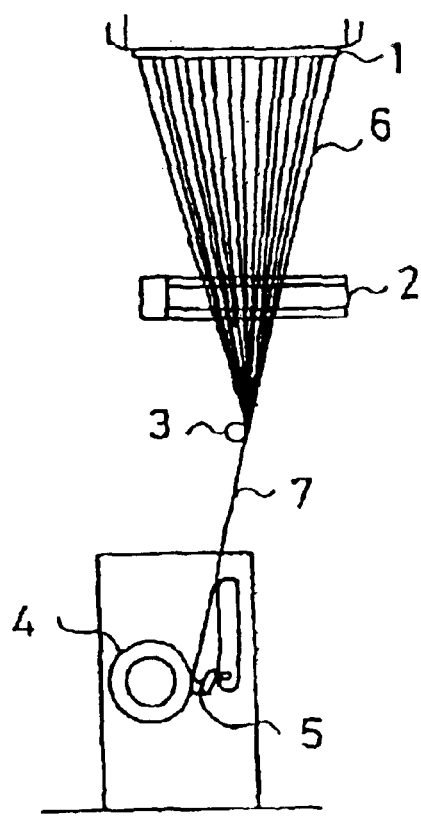
FIG. 4(a) is a front view illustrating an apparatus for producing glass fibers for a direct wind roving.
Figure 4B:
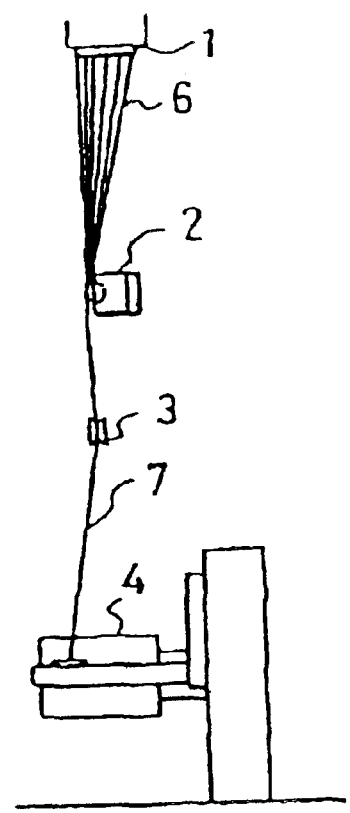
FIG. 4(b) is a side view illustrating the same.
Figure 8:
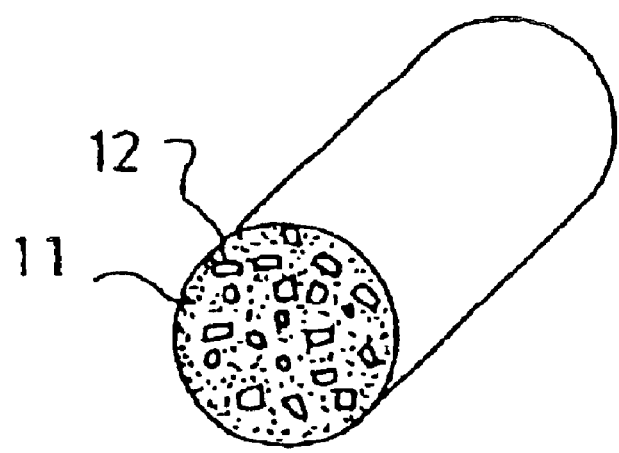
FIG. 8 is a perspective view illustrating a pellet employing chopped strands.
Figure 9:
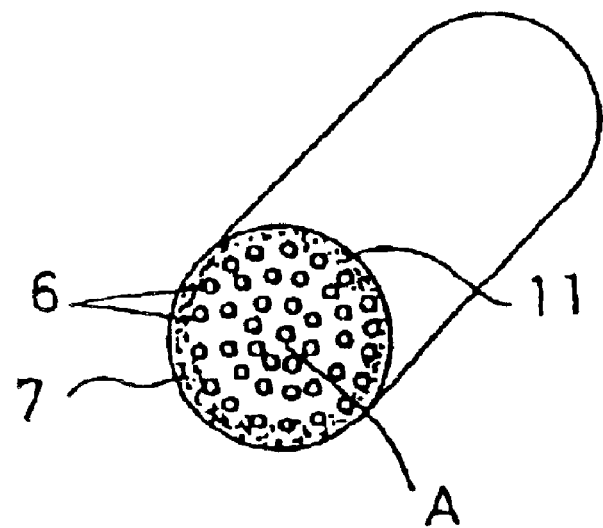
FIG. 9 is a perspective view illustrating a pellet employing direct wind rovings.

The spiral wire 8 comprises two wires 8a and 8b attached to a rotational axis 10 as illustrated in FIGS. 3(a) and 3(b), and the two wires 8a and 8b are in rotational symmetry bent in an arc. The rotational axis 10 rotates as shown by an arrow in FIG. 3(b), and the strand 7 is alternately guided to the wires 8a and 8b to perform a traverse action. By the traverse by means of the spiral wire 8, breakage of the monofilaments due to friction and contact with the strand 7 is less likely to occur as compared with traverse by means of the reciprocating guide component 5 as shown in FIG. 4(a). Further, the strand extends flatly on the spiral wire, and the wound strand is well arranged, and the strand is wound in such a state that the filaments are almost in parallel with one another. Accordingly, the strand is likely to open to filaments when impregnated with the resin, and is excellent in impregnation property.

The obtained cake 9 has such a shape that the strand 7 is wound in a drum-shape, i.e. such a shape that the center part is swollen and the both edges taper, as shown in FIG. 1(b). Accordingly, the phenomenon such that the sizing agent moves to the surface layer together with moisture and is accumulated in the step of air drying or drying by heating after the glass fiber is wound (migration) is less likely to occur as compared with the above direct wind roving, and even if it occurs, it occurs at the beginning of winding at the innermost side of the cake and at the end of winding at the outermost side of the cake, and these parts may be removed so that bad quality parts on which the sizing agent is accumulated do not have to be used.

In the present invention, the number of the monofilaments bundled per one glass fiber strand is preferably at most 1,200. Such is particularly preferred with respect to the direct wind roving since the splicing will easily be carried out. This is because if the number of the monofilaments bundled exceeds 1,200, it will take long for the resin to permeate inside of the glass fiber strand, and impregnation of the resin tends to be inadequate, and further, a twisted part is particularly poor in impregnation properties with the thermoplastic resin, and to improve impregnation with the resin, the time of contact with the resin in the impregnation die is required to be kept long, thus remarkably decreasing productivity. Further, a long impregnation die will be required, and further, the resin heating time tends to be long, whereby heat deterioration of the resin is likely to be induced, and the outer appearance (particularly color tone) of final molded products tends to be impaired. Accordingly, the number of the monofilaments bundled per one glass fiber strand is more preferably from 100 to 1,000, most preferably from 200 to 800.

In the present invention, the count (TEX) per one glass fiber strand is preferably from 150 to 500, more preferably from 200 to 350. If the count is less than 150, the number of the monofilaments has to be small or the diameter of the monofilaments has to be small, whereby productivity of the glass fibers tends to decrease, thus increasing the cost. If the count exceeds 500, the number of the filaments is generally large and impregnation is less likely to be achieved, and the influence of the twist tends to be significant due to increased size of the strand.

Further, of the glass fiber strand drawn out from the roll, the twist multiplier TM preferably satisfies the following formula. Further, the twist multiplier TM is more preferably $0.088 \leq TM \leq 0.300$.

$TM=((\text{denier:g}/9{,}000 \text{ m})^{1/2} \times (\text{number of twist per 1 m}))/287.4$ $0.076 \leq TM \leq 0.350$ The twist multiplier is a concept to arrange the twist angle among cords having different counts, since the twist angle is different depending upon the count even with the same number of twist. The number of twist per 1 m is obtained in such a manner that with respect to the beginning of winding of the roll, i.e. a part first drawn out from the inside, the length of one circuit of the strand drawn out along the inner periphery of the roll is measured five times, the average of the five measurements is obtained, and the number of twist per 1 m is calculated, supposing that the strand of the above length is twisted once. For example, if the length of one circuit of the strand drawn out along the inner periphery while being rotated is 90 cm, the number of twist per 1 m is 0.9 time.

The number of twist per 1 m is employed in the above formula, because the number of twist is extremely small as compared with a conventional cord employing the number of twist per 10 cm. The number of twist per 1 m is obtained at the beginning of the winding of the roll, because the number of twist varies depending upon the thickness direction of the roll, and because if the above formula is satisfied with respect to the number of twist at the beginning of the winding, the twist multiplier TM at the outside with a winding diameter larger than that at the beginning satisfies the range of from 0.076 to 0.350 as a matter of fact. Further, the average of five measurements is employed to obtain the length of one circuit, in order to increase correctness, and only one measurement is enough if the length of one circuit can be obtained. The point is that the number of twist at the inner diameter part of the roll is obtained.

If the twist multiplier TM is less than 0.076, although the degree of twist is low, it is necessary that the inner diameter of the roll exceeds 50 cm or the roll width exceeds 60 cm, and the roll tends to be bulky, or the monofilaments are likely to be broken due to friction of the strand with the inside surface of the roll when the strand is drawn out from the inside, as described above. Further, if the count is less than 150, the twist multiplier TM is less than 0.076, however, as described above, the productivity of the glass fibers tends to be low, thus increasing the cost. On the other hand, if it exceeds 0.350, the degree of twist increases, and the impregnation properties tend to be poor.

In the present invention, the number of the glass fiber strands contained in one pellet is optionally selected depending upon the size of the impregnation die, the number of the monofilaments bundled in the strand, and further, the diameter of the pellet. However, usually it is preferably from 3 to 35, more preferably from 5 to 15. If the number of the glass fiber strands is less than 3, the pellets tend to have a small diameter in relation to the proportion with the resin, whereby production efficiency tends to decrease, and further, the number of the monofilaments bundled per one strand increases consequently, and as a result, nozzle clogging in the resin impregnation die is likely to occur at the splicing portions. On the other hand, if it exceeds 35, adhesion among strands tends to be inadequate, whereby the pellets are likely to be broken when pelletized. Further, if the number of the strands is large, the time required for setting tends to be long at the time of production, and the frequency of splicing tends to increase.

The content of the glass fibers in the L-FTP pellets is preferably from 30 to 85 mass %, more preferably from 40 to 75 mass %. If the content of the glass fibers is less than 30 mass %, the glass content as master pellets used for formation of FRTP tends to be inadequate, and if it exceeds 85 mass %, the amount of the resin tends to be too small relative to the amount of the glass fibers, whereby impregnation of the glass fibers tends to be inadequate.

The L-FTP pellets of the present invention may be produced by using a production apparatus as disclosed in JP-A-59-49913, JP-B-52-10140 or U.S. Pat. No. 4,439,387, and a production apparatus as shown in FIG. 5 may, for example, be employed. In FIG. 5, glass fiber strands 7 drawn out from the inside of a plurality of glass fiber rolls such as cakes 9 are passed through a preheating furnace 24, and then introduced into a resin impregnation die (mold) 21. Into this resin impregnation die 21, a molten thermoplastic resin kneaded under heating is fed from an extruding machine 25, and the plurality of assembled glass fiber strands 7 are impregnated with the thermoplastic resin in the resin impregnation die 21, and at the same time, formed into a linear shape with a substantially circular cross section. The linear molded product 28 thus obtained is cooled and solidified while it is passed through a cooling bath 26, drawn out by a drawing apparatus 27 and cut into a predetermined length by a pelletizer 29 to obtain pellets 30 of the present invention. The length of the pellets 30 is not particularly limited, but usually it is suitably from 0.3 to 3 cm.

In the above production of L-FTP pellets, each of the glass fiber strands 7 drawn out from the respective cakes 9 has tension caused by drawing and a slight degree of twist, however, the number of twist per unit length is so small as at most one time per 1 m as shown in FIG. 6(a), since the inner diameter of the cakes 9 is increased to 18 cm or more. Whereas, the glass fiber strand 7 drawn out from a conventional roll having a small inner diameter has the number of twist of so much as twice as shown in FIG. 6(b). The glass fiber strand 7 of the present invention has a small number of twist as compared with a conventional strand and is more likely to open, and accordingly when it is impregnated with a thermoplastic resin in the resin impregnation die 21, the gap in each separate monofilament is adequately impregnated with the resin.

In the L-FTP pellet 30 of the present invention, as shown in FIG. 7, a plurality of glass fiber strands 7 are assembled along the longitudinal direction (drawing direction) of the pellet, covered with a thermoplastic resin 11 and united, and the thermoplastic resin 11 uniformly permeate even the gap in each separate monofilament 6 in each of the glass fiber strands 7. On the other hand, the glass fibers or the monofilaments in the pellet are contained in such a state that they are not substantially distorted or twisted, and accordingly they are substantially continuous in the entire longitudinal direction of the pellet, and they are aligned almost in parallel with one another.

Further, as the glass fiber strand 7, one drawn out from a cake 9 obtained by bundling the monofilaments 6 and winding them into a drum shape while traversing them by means of a spiral wire 8, followed by drying by heating, is used, and accordingly the strand 7 has a relatively flat shape, and the shape of the glass fiber strand 7 in the cross section of the L-FTP pellets is flat as compared with a conventional one. The L-FTP pellets 30 are introduced into an injection machine by themselves or after blended with pellets consisting of a thermoplastic resin alone and containing no reinforcing material in an optional proportion, to form a molded product of FRTP.

Now, the present invention will be described in further detail with reference to Examples. However, it should be understood that the present invention is by no means restricted to such specific Examples.

EXAMPLE 1

Ten glass fiber strands, each drawn out from a cake having an inner diameter of 28.6 cm and a roll width of 23.0 cm (TM=0.212), obtained by bundling 600 monofilaments having a diameter of 16 μm (330 TEX) and winding them into a drum-shape by means of a spiral wire, were assembled as a reinforcing material, and ten of such assemblies were respectively passed through ten nozzles of a resin impregnation die, and by using as a thermoplastic resin, one comprising polypropylene of MI=30 and 10% of acid-modified polypropylene (manufactured by UNIROYAL CHEMICAL, tradename: POLYBOND 3200) added thereto, the glass fiber strands were drawn out from the ten nozzles of φ2.2 mm at a resin temperature of 260° C. at a rate of 20 m/min by a method as shown in FIG. 5 to produce L-FTP pellets of polypropylene/glass fiber (GF) having a glass content of 60 mass %.

Further, employing the L-FTP pellets as master pellets, polypropylene was added thereto in a predetermined amount, and a strength test specimen in accordance with ASTM having a glass fiber content of 30 mass % was prepared by means of an injection machine.

EXAMPLE 2

L-FTP pellets of polypropylene/GF having a glass content of 60 mass % were produced in the same manner as in Example 1 except that twelve glass fiber strands, each drawn out from a cake having an inner diameter of 28.6 cm and a roll width of 23.0 cm (TM=0.175), obtained by bundling 600 monofilaments having a diameter of 13 μm (225 TEX) and winding them into a drum-shape by means of a spiral wire, as a reinforcing material, were employed.

Further, in the same manner as in Example 1, a strength test specimen in accordance with ASTM having a glass fiber content of 30 mass % was prepared.

EXAMPLE 3

L-FTP pellets of polypropylene/GF having a glass content of 60 mass % were produced in the same manner as in Example 1 except that ten glass fiber strands, each drawn out from a cake having an inner diameter of 20.0 cm and a roll width of 30.0 cm (TM=0.302), obtained by bundling 600 monofilaments having a diameter of 16 μm (330 TEX) and winding them into a drum-shape by means of a spiral wire, as a reinforcing material, were employed.

Further, in the same manner as in Example 1, a strength test specimen in accordance with ASTM having a glass fiber content of 30 mass % was prepared.

EXAMPLE 4

L-FTP pellets of polypropylene/GF having a glass fiber content of 60 mass % were produced in the same manner as in Example 1 except that three glass fiber strands, each drawn out from a direct wind roving (referred to as roving in Table 1) having an inner diameter of 28.6 cm and a roll width of 33.0 cm (TM=0.387), having 2,000 monofilaments bundled (1,100 TEX), each monofilament having a diameter of 16 μm, were employed as a reinforcing material.

Further, employing the L-FTP pellets as master pellets, in the same manner as in Example 1, a strength test specimen in accordance with ASTM having a glass content of 30 mass % was prepared.

Comparative Example 1

L-FTP pellets of polypropylene/GF having a glass content of 60 mass % were produced in the same manner as in Example 1 except that seven glass fiber strands, each drawn out from a cake having an inner diameter of 16.0 cm and a roll width of 20.0 cm (TM=0.437), obtained by bundling 800 monofilaments having a diameter of 16 μm (440 TEX) and winding them into a drum-shape by means of a spiral wire, as a reinforcing material, were assembled, and five of such assemblies were respectively passed through five nozzles, and eight glass fiber strands were assembled, and five of such assemblies were respectively passed through five nozzles.

Further, employing the L-FTP pellets as master pellets, in the same manner as in Example 1, a strength test specimen in accordance with ASTM having a glass content of 30 mass % was prepared.

Comparative Example 2

L-FTP pellets of polypropylene/GF having a glass content of 60 mass % were produced in the same manner as in Example 1 except that ten glass fiber strands, each drawn out from a direct wind roving having an inner diameter of 16.0 cm and a roll width of 26.5 cm (TM=0.378) having 600 monofilaments bundled (330 TEX), each monofilament having a diameter of 16 μm, were assembled as a reinforcing material.

Further, by employing the L-FTP pellets as master pellets, in the same manner as in Example 1, a strength test specimen in accordance with ASTM having a glass content of 30 mass % was prepared.

Comparative Example 3

L-FTP pellets of polypropylene/GF having a glass content of 60 mass % were produced in the same manner as in Example 1 except that three glass fiber strands, each drawn out from a direct wind roving (referred to as roving in Table 2) having an inner diameter of 16.0 cm and a roll width of 26.5 cm (TM=0.690) having 2,000 monofilaments bundled (1,100 TEX), each monofilament having a diameter of 16 μm, as a reinforcing material, were assembled.

Further, employing the L-FTP pellets as master pellets, in the same manner as in Example 1, a strength test specimen in accordance with ASTM having a glass content of 30 mass % was prepared.

Comparative Example 4

L-FTP pellets of polypropylene/GF having a glass content of 60 mass % were produced in the same manner as in Example 1 except that ten glass fiber strands, each drawn out from a cake having an inner diameter of 16.0 cm and a roll width of 26.5 cm (TM=0.378) obtained by bundling 600 monofilaments having a diameter of 16 μm (330 TEX) and winding them into a drum shape by means of a spiral wire, were assembled as a reinforcing material.

Further, employing the L-FTP pellets as master pellets, in the same manner as in Example 1, a strength test specimen in accordance with ASTM having a glass content of 30 mass % was prepared.

In the above Examples 1 to 4 and Comparative Examples 1 to 4, (a) breakage of strands due to clogging with fuzz and (b) possibility of splicing were observed, and the impregnation state with the thermoplastic resin in the L-FTP pellets was evaluated, at the time of production of L-FTP pellets. Further, the flexural strength and the impact strength of each strength test specimen were measured, and the results are shown in Table 1 together with the above production conditions.

The evaluation for "impregnation state of pellets" was carried out by means of a red marker test (ink test), in which the pellets were soaked in an ink, coloring from the edge of the pellets towards the longitudinal direction was visually evaluated, and evaluation was made on the basis of five stages of 1 (good) to 5 (poor). Further, with respect to "breakage of strands due to clogging with fuzz", evaluation was made 10 hours after initiation of the operation.

As evident from Tables 1 and 2, in Comparative Examples 1 to 4 wherein the inner diameter of the roll is smaller than 18 cm, the twist multiplier is higher and the twist tends to be stronger than Examples 1 to 4 of the present invention, and accordingly the impregnation with the resin of the pellets tends to be generally poor. As a result, although the cake which is more excellent in impregnation with the resin, tends to provide more excellent flexural strength and impact strength of a molded product obtained by employing the produced L-FTP pellets, than the roving, Examples of the present invention are excellent as compared with Comparative Examples.

Namely, the roll is a cake in both Example 1 and Comparative Example 4, and conditions are the same except for the inner diameter of the roll, however, even gaps in the glass fibers are adequately impregnated with the resin in the pellets of Example 1, whereas impregnation is inadequate in Comparative Example 4, and the flexural strength and the impact strength of the molded product are poor as compared with Example 1.

Further, in Example 4 and Comparative Example 3, the roll is a direct winding roving obtained by bundling 2,000 strands and winding them into a cylindrical shape, and accordingly the degree of impregnation with the resin of the pellets is poor as compared with the above cases of the cake with respect to both Example 4 and Comparative Example 3. However, the degree of twist of the strands is different depending upon the difference in the inner diameter of the roll, and accordingly there is a significant difference in the impregnation with the resin of the pellets, and the impregnation state with the resin of Comparative example 3 is poor as compared with Example 4, and the strength is also poor in Comparative Example 3. Further, since a large number of strands are bundled, splicing was impossible both in Example 4 and Comparative Example 3, however, the degree of twist is low in Example 4, whereas no breakage of strands due to clogging with fuzz took place, whereas in Comparative Example 3, since the degree of twist of the strands was high, breakage of the strands occurred three times at the nozzle part.

Further, in Examples 1 to 4, breakage of the strands due to clogging with fuzz did not take place at all, whereas in Comparative Example 1, breakage of the strands took place once at the nozzle part since the degree of twist of the strands is high, although the roll was a cake.

Further, Example 2 is an example wherein the diameter of the monofilaments was 13 μm which was small as compared with Example 1, and the number of the strands was increased to 12. It was found that by increasing the number of the strands instead of making the filaments small as mentioned above, the impregnation with the resin of the pellets can be made as good as in Example 1, and further, higher flexural strength and impact strength than those of Example 1 can be obtained by increasing the number of the strands.

TABLE 1

|  | Ex. 1 | Ex. 2 | Ex. 3 | Ex. 4 |
| --- | --- | --- | --- | --- |
| Thermoplastic resin | Polypropylene | Polypropylene | Polypropylene | Polypropylene |
| Constitution of glass fibers | 16 μm × 600 | 13 μm × 600 | 16 μm × 600 | 16 μm × 2,000 |
| Number of strands (number of nozzles) | 10 (×10) | 12 (×10) | 10 (×10) | 3 (×10) |
| Count of one strand (TEX) | 330 | 225 | 330 | 1100 |
| Shape of roll | Cake | Cake | Cake | Roving |
| Inner diameter of roll (cm) | 28.6 | 28.6 | 20.0 | 28.6 |
| Twist multiplier TM | 0.212 | 0.175 | 0.302 | 0.387 |
| Width of roll (cm) | 23.0 | 23.0 | 30.0 | 33.0 |
| Impregnation state of pellets | 1 | 1 | 2 | 2 |
| Breakage of strands due to clogging with fuzz (number of times) | Nil | Nil | Nil | Nil |
| Splicing | Possible | Possible | Possible | Not possible |
| Strength of molded product (flexure: MPa) | 151 | 163 | 149 | 148 |
| Izod V impact strength (J/m) | 168 | 173 | 162 | 158 |

TABLE 2

|  | Comp. Ex. 1 | Comp. Ex. 2 | Comp. Ex. 3 | Comp. Ex. 4 |
| --- | --- | --- | --- | --- |
| Thermaplastic resin | Polypropylene | Polypropylene | Polypropylene | Polypropylene |
| Constitution of glass fibers | 16 μm × 800 | 16 μm × 600 | 16 μm × 2,000 | 16 μm × 600 |
| Number of strands (number of nozzles) | 7–8 (×10) | 10 (×10) | 3 (×10) | 10 (×10) |
| Count of one strand (TEX) | 440 | 330 | 1100 | 330 |
| Shape of roll | Cake | Roving | Roving | Cake |
| Inner diameter of roll (cm) | 16.0 | 16.0 | 16.0 | 16.0 |
| Twist multiplier TM | 0.437 | 0.378 | 0.690 | 0.378 |
| Width of roll (cm) | 20.0 | 26.5 | 26.5 | 26.5 |
| Impregnatian state of pellets | 3 | 4 | 5 | 3 |
| Breakage of strands due to clogging with fuzz (number of times) | 1 (nozzle) | 2 (nozzle) | 3 (nozzle) | Nil |
| Splicing | Possible | Possible | Not possible | Possible |
| Strength of molded product (flexure: MPa) | 145 | 141 | 138 | 146 |
| Izod V impact strength (J/m) | 145 | 143 | 135 | 148 |

In the present invention, as explained above, the inner diameter of the roll is within a range of from 18 to 50 cm and is larger than that of a conventional one. Thus, the twist multiplier per unit length of the strand drawn out from the inside of the roll and supplied to e.g. a resin impregnation die can be reduced as compared with a conventional roll. Accordingly, the strand is likely to open as monofilaments in the resin impregnation die, whereby gaps in the monofilaments can adequately be impregnated with a thermoplastic resin to produce L-FTP pellets.

Further, since the winding inner diameter of the roll is large, it is possible to increase the winding amount without increasing the winding thickness of the roll, whereby the frequency of splicing can be reduced and workload can be reduced, and further, the part on which a sizing agent is accumulated at a high concentration due to migration can be decreased as compared with a conventional roll having a small inner diameter with the same winding amount.

Further, the L-FTP pellets are produced with strands with a small number of twist and a low degree of twist as mentioned above, high quality pellets can be obtained, wherein the adhesion between the glass fibers and the resin in the L-FTP pellets is improved, and the glass fibers are substantially continuous over the entire longitudinal direction of the pellets and are aligned almost in parallel with one another. As a result, strength of the molded product obtained by e.g. injection molding can be improved.

The entire disclosure of Japanese Patent Application No. 2002-181517 filed on Jun. 21, 2002 including specification, claims, drawings and summary is incorporated herein by reference in its entirety.

What is claimed is:

1. A process for producing glass fiber-reinforced thermoplastic resin pellets, which comprises a step of drawing out glass fiber strands from the inside of glass fiber rolls and introducing them into a resin impregnation die, a step of supplying a molten thermoplastic resin into the resin impregnation die and impregnating the glass fiber strands with the thermoplastic resin, a step of drawing out the glass fiber strands impregnated with the thermoplastic resin from the resin impregnation die and cooling and solidifying the thermoplastic resin to obtain a linear molded product, and a step of cutting the molded product into a predetermined length, wherein as the glass fibers, glass fiber strands drawn out from rolls, each roll obtained by bundling monofilaments having a diameter of from 6 to 25 $\mu$m and winding them so that the inner diameter will be from 18 to 50 cm, are used.

2. The process for producing glass fiber-reinforced thermoplastic resin pellets according to claim 1, wherein each roll is obtained by winding a glass fiber strand into a drum shape while traversing the strand by means of a spiral wire.

3. The process for producing glass fiber-reinforced thermoplastic resin pellets according to claim 1, wherein the roll width of each roll is from 10 to 60 cm.

4. The process for producing glass fiber-reinforced thermoplastic resin pellets according to claim 1, wherein the number of the monofilaments bundled per one glass fiber strand is at most 1,200.

5. The process for producing glass fiber-reinforced thermoplastic resin pellets according to claim 1, wherein the count (TEX:g/1,000 m) per one glass fiber strand is from 150 to 500.

6. The process for producing glass fiber-reinforced thermoplastic resin pellets according to claim 1, wherein the glass fiber content in the pellets is from 30 to 85 mass %.

7. The process for producing glass fiber-reinforced thermoplastic resin pellets according to claim 1, wherein the number of the glass fiber strands contained in the pellets is from 3 to 35.

8. The process for producing glass fiber-reinforced thermoplastic resin pellets according to claim 1, wherein the twist multiplier TM of the glass fiber strand drawn out from each roll satisfies the following formula:

$TM=((\text{denier:g}/9{,}000\text{ m})^{1/2} \times (\text{number of twist per 1 m}))/287.4,$ $0.076 \leq TM \leq 0.350.$ 9. Glass fiber-reinforced thermoplastic resin pellets which are produced by the process as defined in claim 1, wherein the glass fibers are substantially continuous over the entire longitudinal direction of the pellets and are aligned almost in parallel with one another.

10. A roll for glass fiber-reinforced thermoplastic resin pellets, wherein the twist multiplier TM of a glass fiber strand drawn out from the roll satisfies the following formula:

$TM=((\text{denier:g}/9{,}000\text{ m})^{1/2} \times (\text{number of twist per 1 m}))/287.4,$ $0.076 \leq TM \leq 0.350.$

* * * * *